(12) United States Patent
Cohen et al.

(10) Patent No.: US 12,732,692 B2
(45) Date of Patent: Sep. 8, 2026

(54) METHOD AND SYSTEM OF DEVELOPING AN IMAGING CONFIGURATION TO OPTIMIZE PERFORMANCE OF A MICROSCOPY SYSTEM

(71) Applicant: Molecular Devices, LLC, San Jose, CA (US)

(72) Inventors: Avrum Cohen, San Jose, CA (US); Steven Luke, San Jose, CA (US); Dihui Hong, San Jose, CA (US); Loren Stauffer, San Jose, CA (US)

(73) Assignee: Molecular Devices, LLC, San Jose, CA (US)

( * ) Notice: Subject to any disclaimer, the term of this patent is extended or adjusted under 35 U.S.C. 154(b) by 594 days.

(21) Appl. No.: 18/027,320

(22) PCT Filed: Sep. 14, 2021

(86) PCT No.: PCT/US2021/050231
§ 371 (c)(1),
(2) Date: Mar. 20, 2023

(87) PCT Pub. No.: WO2022/060712
PCT Pub. Date: Mar. 24, 2022

(65) Prior Publication Data

US 2023/0345115 A1 Oct. 26, 2023

Related U.S. Application Data

(60) Provisional application No. 63/081,019, filed on Sep. 21, 2020.

(51) Int. Cl.
*G06T 7/00* (2017.01)
*G06V 10/98* (2022.01)
(Continued)

(52) U.S. Cl.
CPC .......... *H04N 23/64* (2023.01); *G06T 7/0012* (2013.01); *G06V 10/993* (2022.01);
(Continued)

(58) Field of Classification Search
CPC ................. H04N 23/64; G06T 7/0012; G06T 2207/10056; G06T 2207/20081;
(Continued)

(56) References Cited

U.S. PATENT DOCUMENTS 8,577,079 B2 11/2013 Cohen et al.
10,706,259 B2 7/2020 Cohen et al.
(Continued)

FOREIGN PATENT DOCUMENTS

CN 107430265 A 12/2017
JP 2020-113769 7/2020
(Continued)

OTHER PUBLICATIONS

International Search Report and Written Opinion in connection with International Application No. PCT/US2021/050231, Issued Dec. 27, 2021 (9 pages).

(Continued)

*Primary Examiner* — Han Hoang
(74) *Attorney, Agent, or Firm* — Merchant & Gould P.C.

(57) ABSTRACT

A method and system of operating a microscopy system are disclosed. A first image first image of a sample acquired using a first imaging configuration is received. A second image is developed from the first image, wherein the second image is associated with a second imaging configuration. A sequence of image processing steps is applied to the first image to develop a first classification of first objects represented in the first image and to the second image to develop a second classification of second objects represented in the second image. A score associated with the second imaging
(Continued)

configuration is developed that represents a difference between the first classification and the second classification. The image acquisition time or component requirements of operating the microscopy system is less when operated using the second imaging configuration than when operated using the first imaging configuration.

20 Claims, 6 Drawing Sheets

(51) Int. Cl.
*G06V 20/69* (2022.01)
*H04N 23/60* (2023.01)

(52) U.S. Cl.
CPC .. *G06V 20/698* (2022.01); *G06T 2207/10056* (2013.01); *G06T 2207/20081* (2013.01); *G06T 2207/30168* (2013.01)

(58) Field of Classification Search
CPC ........ G06T 2207/30168; G06V 10/993; G06V 20/698; G06V 20/693; G02B 21/367; G06N 20/00
See application file for complete search history.

(56) References Cited

U.S. PATENT DOCUMENTS 10,706,261 B2 7/2020 Cohen et al.
10,929,716 B2 2/2021 Cohen
11,985,415 B2 * 5/2024 Amthor .................. G06V 20/69
2018/0137338 A1 * 5/2018 Kraus ....................... G06T 7/10
2019/0004298 A1 * 1/2019 Honjo .................. G02B 21/008
2019/0302031 A1 * 10/2019 Plihal ................. G01N 21/8806
2020/0013155 A1 1/2020 Putman et al.
2021/0333537 A1 * 10/2021 Bayer ................... G06T 7/0012

FOREIGN PATENT DOCUMENTS

JP 2020-526872 8/2020
KR 1020160078955 7/2016
KR 1020200014444 2/2020

OTHER PUBLICATIONS

PCT International Preliminary Report on Patentability in Application PCT/US2021/050231, mailed Mar. 30, 2023, 6 pages.
European Extended Search Report in Application 21870058.1, mailed Aug. 29, 2024, 8 pages.
Lindblad, Joakim et al., "Optimizing Optics and Imaging for Pattern Recognition Based Screening Tasks", 18th Int. Conference on Pattern Recognition (ICPR '06), IEEE Computer Society, US, Aug. 24, 2014, pp. 3333-3338.
Chinese 1st Office Action in corresponding Application 202180064460.9, with English translation, mailed Oct. 29, 2025, 9 pages.

* cited by examiner

START
202
200
Receive pilot imaging configuration
204
Configure imaging device
206
Acquire and store high-quality images
208
Display high-quality images
210
Receive sequence of image processing steps
212
Undertake sequence of image processing steps
214
Display output of sequence of image processing steps
216
Y
Assay protocol adjustment?
N
218
Develop production assay protocol
END

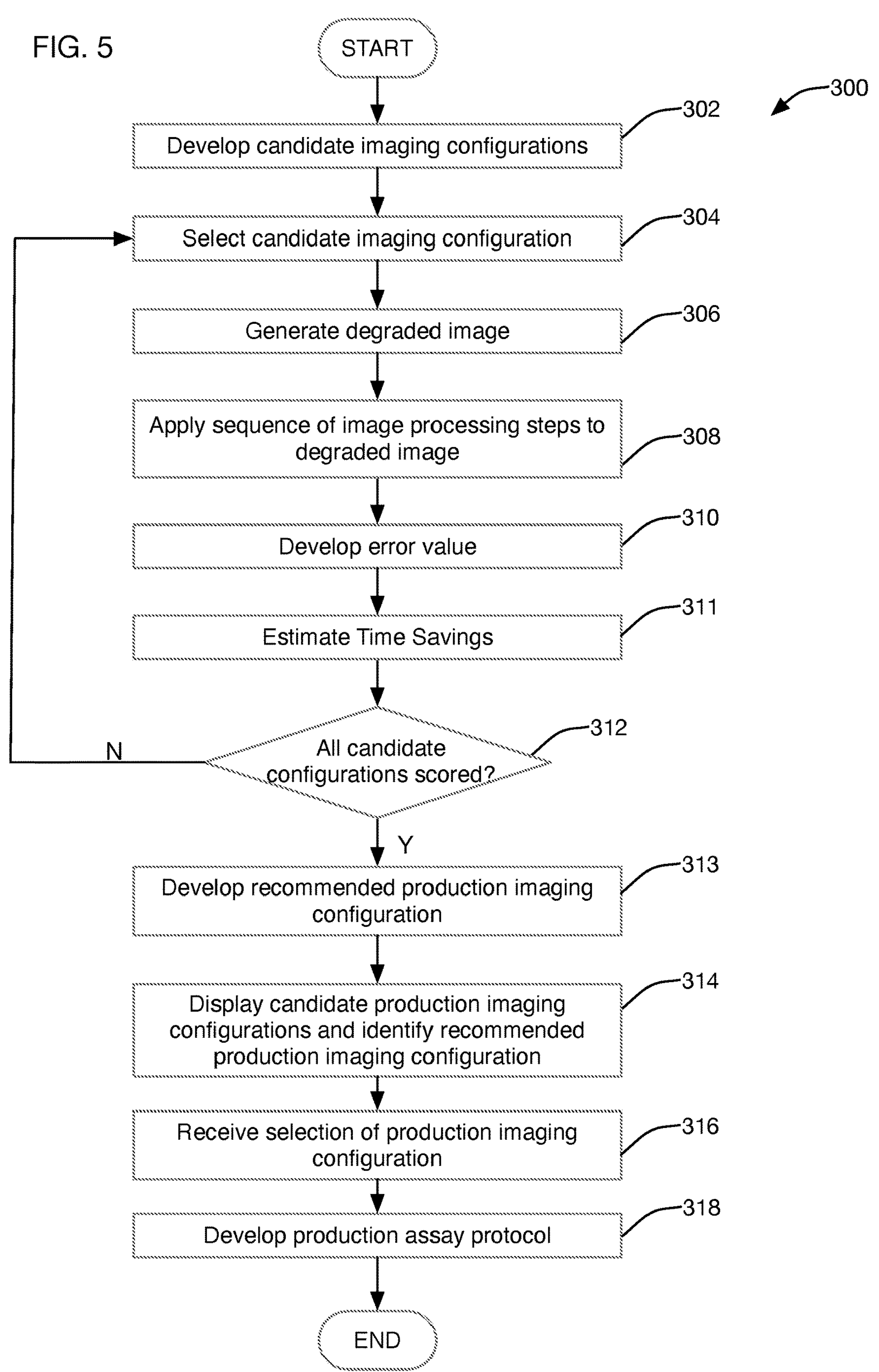
FIG. 5
START
300
302
Develop candidate imaging configurations
304
Select candidate imaging configuration
306
Generate degraded image
308
Apply sequence of image processing steps to degraded image
310
Develop error value
311
Estimate Time Savings
312
All candidate configurations scored?
N
Y
313
Develop recommended production imaging configuration
314
Display candidate production imaging configurations and identify recommended production imaging configuration
316
Receive selection of production imaging configuration
318
Develop production assay protocol
END

METHOD AND SYSTEM OF DEVELOPING AN IMAGING CONFIGURATION TO OPTIMIZE PERFORMANCE OF A MICROSCOPY SYSTEM

CROSS REFERENCE TO RELATED APPLICATIONS

This application is a National Stage Application of PCT/US2021/050231, filed Sep. 14, 2021, which claims the benefit of U.S. Provisional Patent Application No. 63/081,019, filed Sep. 21, 2020, the entire disclosures of which are incorporated herein by reference in their entireties. To the extent appropriate, a claim of priority is made to each of the above disclosed applications.

FIELD OF DISCLOSURE

The present subject matter relates to microscopy systems, and more particularly, to a method and system for developing an imaging configuration to optimize operation of a microscopy system.

BACKGROUND

A microscopy system, e.g., a high-content imaging system, may be used to conduct experiments in which microscopy images of biological samples are acquired and analyzed. Such images may be processed using an image analysis system to identify pixels of the image that are associated with objects of interest (cells, organelles, and the like) represented therein, to classify or characterize the different types of objects of interest represented in the image, to obtain metrics regarding such objects of interest or portions thereof and the like. For each biological sample, such metrics may include, for example, a count of the objects of interest in the sample, a count of each type of object of interest represented in the biological sample, sizes (area, perimeter, volume) of the objects of interest, statistics (mean, mode, median, standard deviation, etc.) of the sizes of the objects of interest, characteristics of the objects of interest (e.g., if the object is alive or dead, if the object contains a particular protein, etc.), and the like.

To conduct the experiment, the researcher may develop a pilot assay protocol that comprises a pilot imaging configuration that specifies values associated with imaging parameters (e.g., objective lens, magnification, exposure time, focus accuracy, etc.) for operating the microscopy system to acquire one or more image(s) of the biological sample and image analysis steps to analyze such images. Such values of imaging parameters may specify a magnification level (e.g., a high magnification level), a number of images of the biological sample to acquire, a number of focal planes (i.e., at different z-planes) at which to acquire images of the biological sample, an exposure time (e.g., a high exposure time to use the full dynamic range of the microscopy system), using confocal imaging, using specialized optics (e.g., water or oil immersion optics), and the like. Further, if the pilot population of biological samples are disposed in wells of a microplate, the imaging parameters may specify acquiring one or more image(s) of different portions of each well at high-resolution and/or different focal positions.

After the researcher has developed the pilot assay protocol, a production assay protocol is developed that is suitable for acquiring and analyzing production images of a production population of biological samples to verify the findings of the experiment conducted using pilot assay. As would be understood by one having ordinary skill in the art, the production population of biological samples comprises significantly more samples than the pilot population of biological samples. In some cases, the pilot imaging configuration used to acquire high-quality images of the pilot population of biological samples may not be practical for acquiring images of the larger production population. For example, acquiring multiple images of each biological sample of the production populate at high-resolution, using long exposure time, multiple images per location, etc. may require too much time. Further, acquisition of images of the larger population may be distributed among multiple microscopy systems and equipping all such microscopy systems with expensive high-quality components such as confocal imagers, specialized optics, etc. specified by the pilot imaging configuration may not be feasible.

SUMMARY

According to one aspect, a method of operating a microscopy system includes the steps of receiving a first image of a sample acquired using a first imaging configuration and developing a second image from the first image, wherein the second image is associated with a second imaging configuration. The method includes the further steps of applying a sequence of image processing steps to the first image to develop a first classification of first objects represented in the first image, applying the sequence of image processing steps to the second image to develop a second classification of second objects represented in the second image, and developing a score associated with the second imaging configuration that represents a difference between the first classification and the second classification. The image acquisition time or component requirements of operating the microscopy system is less when operated using the second imaging configuration than when operated using the first imaging configuration.

According to another aspect, a system for operating a microscopy system includes an imaging configuration optimizer, a degraded image generator, an image analyzer, and an imaging configuration scorer, all operating on one or more processors. The imaging configuration optimizer receives a first image of a sample acquired using a first imaging configuration. The degraded image generator develops a second image from the first image, wherein the second image is associated with a second imaging configuration. The image analyzer applies a sequence of image processing steps to the first image and the second image to develop a first classification, wherein the first classification is associated with first objects represented in the first image. The imaging configuration scorer applies the sequence of image processing steps to the second image to develop a second classification that is associated with second objects represented in the second image, and develops a score associated with the second imaging configuration that represents a difference between the first classification and the second classification. The image acquisition time or component requirements of operating the microscopy system is less when operated using the second imaging configuration than when operated using the first imaging configuration.

Other aspects and advantages will become apparent upon consideration of the following detailed description and the attached drawings wherein like numerals designate like structures throughout the specification.

BRIEF DESCRIPTION OF THE DRAWINGS

FIG. 5 is a flowchart of the steps undertaken by the imaging configuration optimizer of FIG. 4 to develop an imaging configuration.

DETAILED DESCRIPTION

Figure 1:
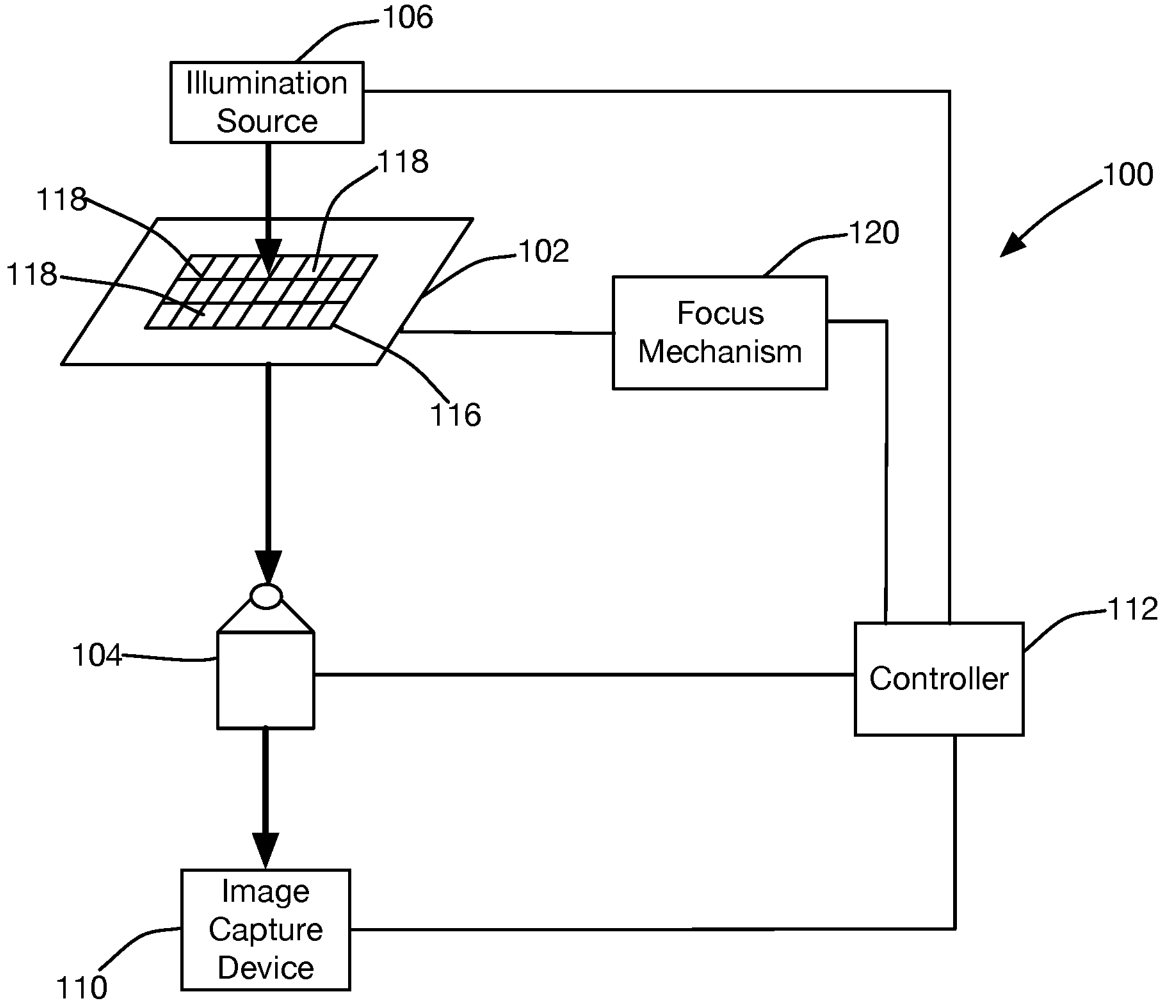
FIG. 1 is a schematic diagram of a microscopy system.

In accordance with the embodiments disclosed herein, an image analysis system facilitates development of a pilot assay protocol. The pilot assay protocol comprises a pilot imaging configuration and a sequence of image analysis steps used to analyze images from a microscopy system operated in accordance with the pilot imaging configuration.

In addition, the image analysis system receives a high-quality image of a biological sample acquired using the pilot imaging configuration. An imaging configuration optimizer of the image analysis system develops from the pilot imaging configuration and the high-quality image, a plurality of additional imaging configurations (i.e., candidate production imaging configurations). Each candidate production imaging configuration is such that operating the microscopy system using the candidate production imaging configuration requires one or both of less time and less specialized equipment to acquire an image than if operated using the pilot imaging configuration. In addition, for each candidate production imaging configuration, the imaging configuration optimizer develops from the high-quality image, a degraded image that simulates an image that would be acquired if the microscopy system were operated using the candidate production imaging configuration. Further, each candidate production imaging configuration is evaluated by the imaging configuration optimizer to develop a score that represents how well objects or characteristics of objects may be identified in an image acquired using the candidate production imaging configuration compared to one acquired using the pilot imaging configuration. In particular, the imaging configuration optimizer analyzes the degraded image associated with the candidate production imaging configuration to identify first characteristics of objects therein, and compares the first characteristics of objects identified in the degraded image with second characteristics of objects identified in the high-quality image. The score associated with the candidate production imaging configuration indicates how closely the first characteristics match the second characteristics.

For example, the score may indicate a percent of features of interest identified in the high-quality image that were also correctly identified in the degraded image associated with the candidate production imaging configuration. Such features of interest may include cells, cells having particular characteristics, organelles, proteins, and the like. In some embodiments, the score may indicate how accurately cells classified (e.g., live cells versus dead cells, cells to which a treatment has been applied versus control cells, cells of a first type versus cells of a second type, etc.) in the high-quality image were classified in the degraded image. In some embodiments, the imaging configuration optimizers analyzes the scores associated with the candidate production imaging configurations and estimates of acquisition time saved using the candidate production imaging configurations to select a recommended production imaging configuration to use a production assay protocol.

To develop the candidate production imaging configurations, the image analyzer applies the sequence of image analysis steps to the high-quality image to develop a classification of the objects represented in the high-quality image. Such classification may include identification of particular types of objects (e.g., cells, organelles, proteins, and the like) and/or characteristics (e.g., size, quantity, type, mortality, etc.) of such objects.

Thereafter, the imaging configuration optimizer develops a degraded image from the high-quality image in accordance with each candidate production imaging configuration. The degraded image simulates an image that would be acquired if the microscopy system were configured using the candidate production imaging configuration associated with such degraded image.

The imaging configuration optimizer automatically analyzes each degraded image to identify and classify the objects associated with the pilot biological sample represented in such images. For each degraded image, the classification of the objects identified in the degraded image is compared with the classification of the objects identified in the high-quality image to develop a score that represents how accurately objects may be identified in the degraded image and classified. In some embodiments, the imaging configuration optimizer selects the candidate production imaging configuration associated with the best score as the production imaging configuration to use in the production assay protocol. In other embodiments, the imaging configuration optimizer presents to a researcher a listing of one or more of the candidate production imaging configurations and the score associate with each such candidate production imaging configuration and, in response, receives a selection of one of the presented candidate production imaging configurations to use in a production assay protocol.

Referring to FIG. 1, as will be apparent to those who have skill in the art, a microscopy system 100, such as a high-content microscopy system, may include an X-Y stage 102, one or more objective lenses 104, one or more illumination sources 106, an image capture device 110, and a controller 112. The microscopy system 100 may also include one or more mirrors (not shown) that direct light from the illumination source 106 to a sample tray or microplate 116 disposed on the X-Y stage 102. The light is then transmitted through such microplate 116, through the objective lens 104, and to the image capture device 110. In some embodiments, the microplate 116 includes a plurality of wells 118, and biological samples (for example, biological cells) to be imaged by the microscopy system 100 may be disposed in each such well 118.

During operation, the microplate 116 may be placed, either manually or robotically, on the X-Y stage 102. In addition, the controller 112 may configure the microscopy system 100 in accordance with an imaging configuration (e.g., the pilot or production imaging configuration described above) to use a combination of a particular objective lens 104, illumination generated by the illumination source 106, and the like. For example, the controller 112 may operate positioning devices (not shown) to place a selected objective lens 104 and in the light path between the microplate 116 and the image capture device 110. The controller 112 may also direct the illumination source 106 to illuminate the microplate 116 with particular wavelengths of light. In some cases, the samples in the microplate 116 may contain molecules that fluoresce, either naturally occurring molecules, or molecules produced or present within the samples due to treatment. The wavelength of light generated by the illumination device may be the excitation wavelengths associated with such fluorescent molecules, and the imaging capture device will capture only the emission spectrum of such fluorescent materials. One or more wavelengths may be used to serially or simultaneously illuminate the same samples and produce images.

In addition, in some embodiments, the controller 112 may operate a focus mechanism 120 so that the image capture device 110 may obtain in-focus images of different focus planes, respectively, of the biological samples disposed in the microplate 116.

Thereafter, the controller 112 may operate the X-Y stage 102 so that the well 118 or a portion thereof is in a field of view of the image capture device 110, and actuate the image capture device 110 to acquire an image of the well 118 or the portion thereof. The controller 112 may repeatedly operate the X-Y stage 102 and the image capture device 110 in this manner until images have been captured of all of the wells 118 of the microplate 116 that are of interest. Further, the controller 112 may capture several images of the same well 118 or the same portion thereof, wherein each such image is captured using a different objective lenses 104, illumination wavelength(s), and/or focal position of the image biological sample.

The microscopy system illustrated in FIG. 1 is exemplary and other types of imaging or microscopy systems apparent to one who has ordinary skill in the art may be used to capture high-quality images of the pilot biological sample or production biological samples.

Figure 2:
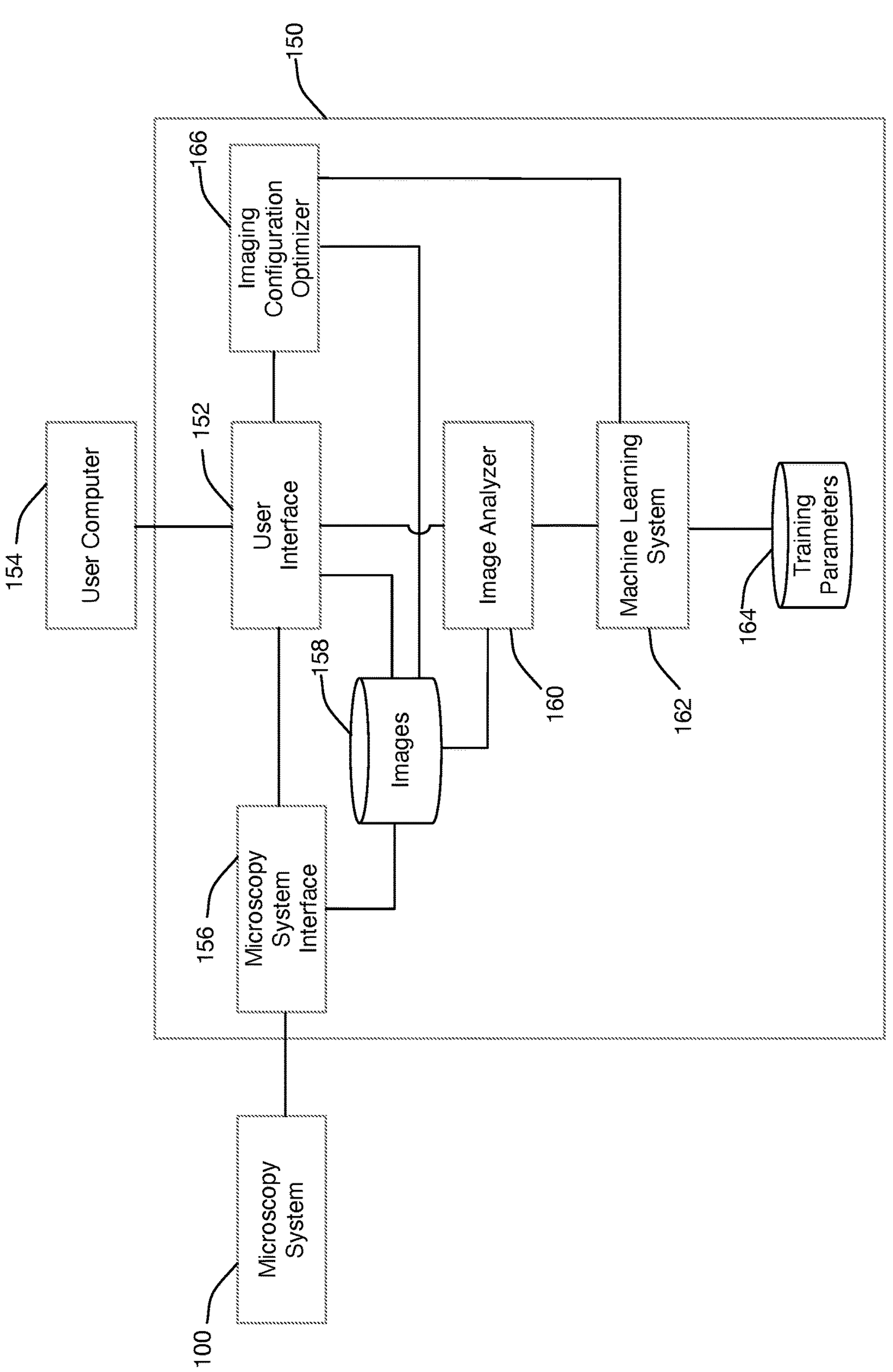
FIG. 2 is a block diagram of an image analysis system that may be used to develop an imaging configuration for operating the microscopy system of FIG. 1.

Referring to FIGS. 1 and 2, a researcher may use an image analysis system 150 in communication with the microscopy system 100 to develop a pilot assay protocol to analyze biological samples disposed on the tray of the microscopy system 100. As noted above the pilot assay protocol comprises a pilot imaging configuration to acquire one or more high-quality images of the biological samples and a sequence of image processing steps to undertake to analyze the acquired images.

In particular, the image analysis system includes a user interface 152 in communication with a user computer 154. As should be apparent to one of ordinary skill in the art, the user interface 152 instructs the user computer 154 to display a graphical user interface (GUI) to allow the researcher to interact with the image analysis system 150. The image analysis system 150 also includes a microscopy system interface 156 in communication with the microscopy system 100, an images data store 158, an image analyzer 160, a machine learning system 162, a training parameters data store 164 that includes sets of training parameters that may be used to configure the machine learning system 162 from an untrained state to a trained state, and an imaging configuration optimizer 166. It should be apparent to one who has ordinary skill in the art that the trained machine learning system 162 may be returned to an untrained state by reinitializing such machine learning system.

Figure 3:
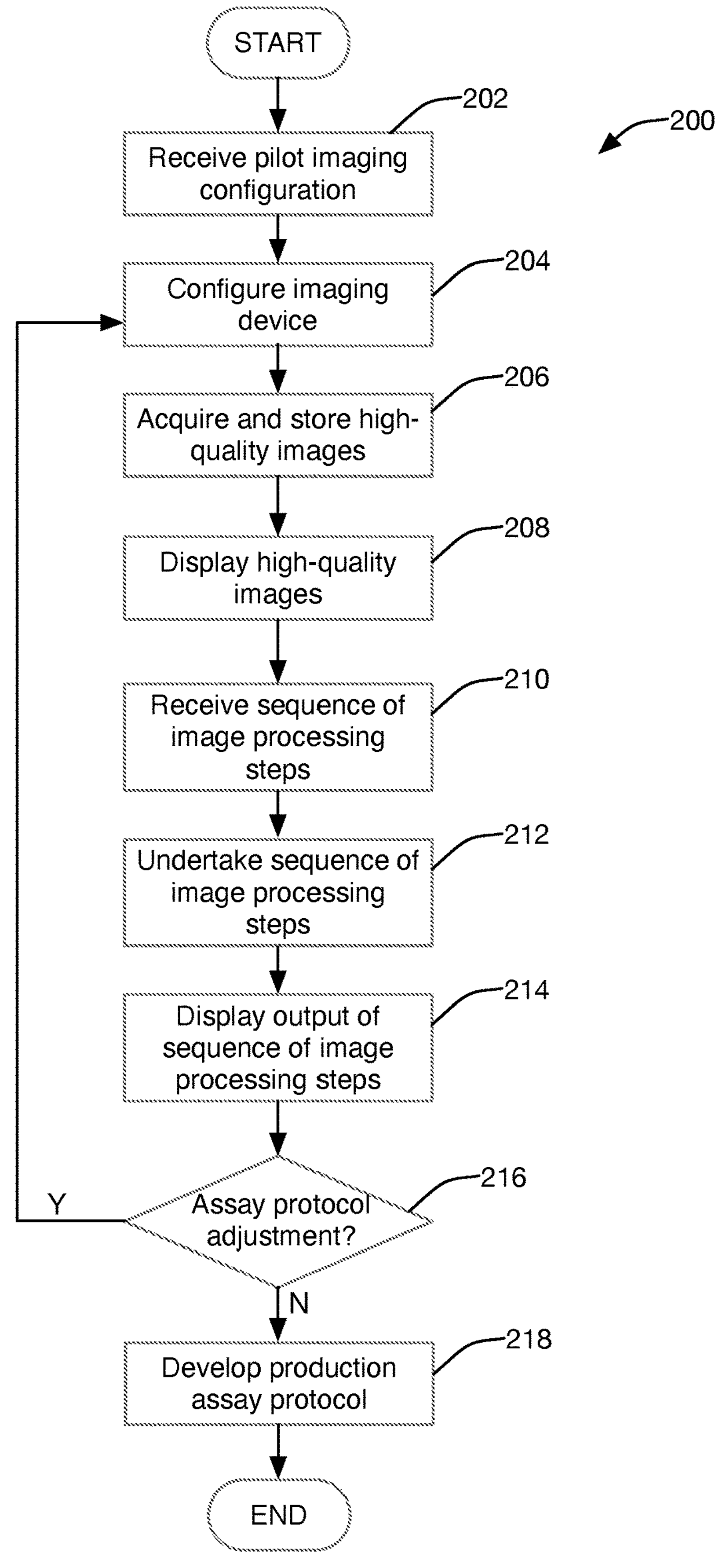
FIG. 3 is a flowchart of the steps undertaken by the image analysis system of FIG. 2 to develop the imaging configuration.

FIG. 3 shows a flowchart 200 of the steps undertaken by the image analysis system 150 to develop a pilot assay protocol and a production assay protocol. Referring to FIGS. 1-3, at step 202, the user interface 152 receives from the user computer 154 a specification of pilot imaging configuration and a directive to capture one or more high-quality image(s) of a biological sample disposed in the microscopy system. In some embodiments, the pilot imaging configuration may be selected from a plurality of predetermined imaging configurations in accordance with, for example, the types of cells in the biological sample, objects or characteristics of objects to be analyzed in images of the biological sample, objectives of assay being conducted, and the like.

At step 204, the user interface 152 provides the pilot imaging configuration to the microscopy system interface 156, which then directs the controller 112 (FIG. 1) of the microscopy system 100 to configure the components in accordance with the pilot imaging configuration. Thereafter, at step 206, the microscopy system interface 156 directs the controller 112 to acquire one or more high-quality image(s) of the biological sample in accordance with the pilot imaging configuration and transmit the acquired high-quality image(s) to the microscopy system interface 156. The microscopy system interface 156, also at step 206, stores the acquired high-quality image(s) in images datastore 158. In some embodiments, at step 208, the user interface 152 instructs the user computer 154 to display the acquired high-quality image(s).

After the high-quality images are captured, at step 210, the user interface 152 receives from the user computer 154 a specification of a sequence of image processing steps.

At step 212, the image analyzer 160 undertakes the image processing steps that comprise the sequence received at step 210 to analyze the acquired high-quality images to identify objects represented therein and/or characteristics of such objects. U.S. Pat. No. 8,577,079, titled "IMAGE PROCESSING SYSTEM PROVIDING SELECTIVE ARRANGEMENT AND CONFIGURATION FOR AN IMAGE ANALYSIS SEQUENCE," to Cohen et al. and U.S. Pat. No. 10,706,259, titled "SYSTEM AND METHOD FOR IMAGE ANALYSIS OF MULTI-DIMENSIONAL DATA," to Cohen et al. disclose systems and methods for specifying and undertaking such a sequence of image processing steps to analyze images. The entire contents of these patents are incorporated herein by reference. The sequence of image processing steps is provided to an image analyzer 160 that undertakes the specified image processing steps on one or more of the high-quality images. Such image processing steps may include selection of an image captured using a particular illumination source, threshold the image, apply one or more filters (e.g., an unsharp mask filter, a smoothing filter, a median filter, and the like), mask or combine one or more images that were captured with different imaging configuration and/or that were the result of applying an imaging processing step to an image.

In some embodiments, the sequence of image processing steps may specify an image processing step that uses the machine learning system 162 to analyze the high-quality image(s). In such embodiments, the training parameters data store 164 may have one or more set(s) predetermined training parameters developed to train the machine learning system 162 to predict the presence of a particular object or characteristics of an object in images of particular types biological samples (i.e., classification of such objects). Examples of developing such a set of training parameters is disclosed in U.S. patent application Ser. No. 16/128,798, titled "SYSTEM AND METHOD FOR LABEL-FREE IDENTIFICATION AND CLASSIFICATION OF BIOLOGICAL SAMPLES," to Cohen et al. and U.S. Pat. No. 10,706,261, titled "SYSTEM AND METHOD FOR AUTOMATICALLY ANALYZING PHENOTYPICAL RESPONSES OF CELLS," to Cohen et al. The entire contents of this application and this patent are incorporated herein by reference.

Referring once again to FIGS. 1-3, to undertake the image analysis step that specifies use of the machine learning system 162, the image analyzer 160, also at step 212, configures an untrained machine learning system 162 in accordance with the specified training parameters to develop a trained machine learning system 162, and operate the trained machine learning system 162 with pixels of one or more images (i.e., one or more high-quality image(s) and/or image(s) that resulted from a previous image processing step) as an input and produce an output that predicts a probability that corresponding pixels of the image are associated with a particular object type or an object type having a particular characteristic (i.e., pixels associated with a classification of an object). The output generated by the trained machine learning 162 may then be used as an input in another image analysis step specified as part of the pilot assay protocol.

It should be apparent that the sequence of image processing steps comprising the pilot assay protocol may include multiple image processing steps that use the machine learning system configured with corresponding sets of training parameters available in the training parameters database 164.

At step 214, the image analyzer 160 directs the user interface 152 to instruct the user computer 154 to display the output generated by applying the sequence of image processing steps to the high-quality image(s) acquired at step 206. Thus, the researcher may evaluate results of using the pilot imaging configuration to capture high-quality image(s) and analyze high-quality image(s) using the specified sequence of image processing steps.

At step 216, the user interface 152 determines if the researcher has used the user computer 154 to adjust the pilot imaging configuration and/or the sequence of image processing steps, for example, to improve how effectively the objects in represented in the image(s) of the biological are classified (i.e., identified or characteristics of such objects determined). If so, the image analysis system 150 returns to step 204, otherwise the image analysis system 150 proceeds to step 218. The researcher may direct the image analysis system 150 to iterate from step 204 through 216 in this manner until the pilot imaging configuration and sequence of image processing steps (i.e., the pilot assay protocol) is developed that captures and analyzes images of the pilot biological sample as expected by the researcher.

After the pilot assay protocol is developed, the researcher uses the user computer 154 to direct the image analysis system 150 to develop the production imaging configuration that comprises the production assay protocol.

As described in greater detail below, in response, at step 218, the imaging configuration optimizer 166 of the image analysis system 150 automatically evaluates the pilot assay protocol to develop a plurality of candidate production imaging configurations and a score for each candidate production imaging configuration. The score represents how well objects and/or characteristics of objects identified in the high-quality image using the sequence of image processing steps may be identified by applying such sequence to an image captured using the candidate production imaging configuration. Thereafter, one of the candidate production imaging configurations (e.g., the candidate production imaging configuration having a highest score) may be selected as a recommended production imaging configuration.

Each of the plurality of candidate production imaging configurations developed at step 218 requires less time and/or less specialized components to capture images of biological samples using the microscopy system 100 compared to the pilot imaging configuration developed by undertaking steps 204-216.

Figure 4:
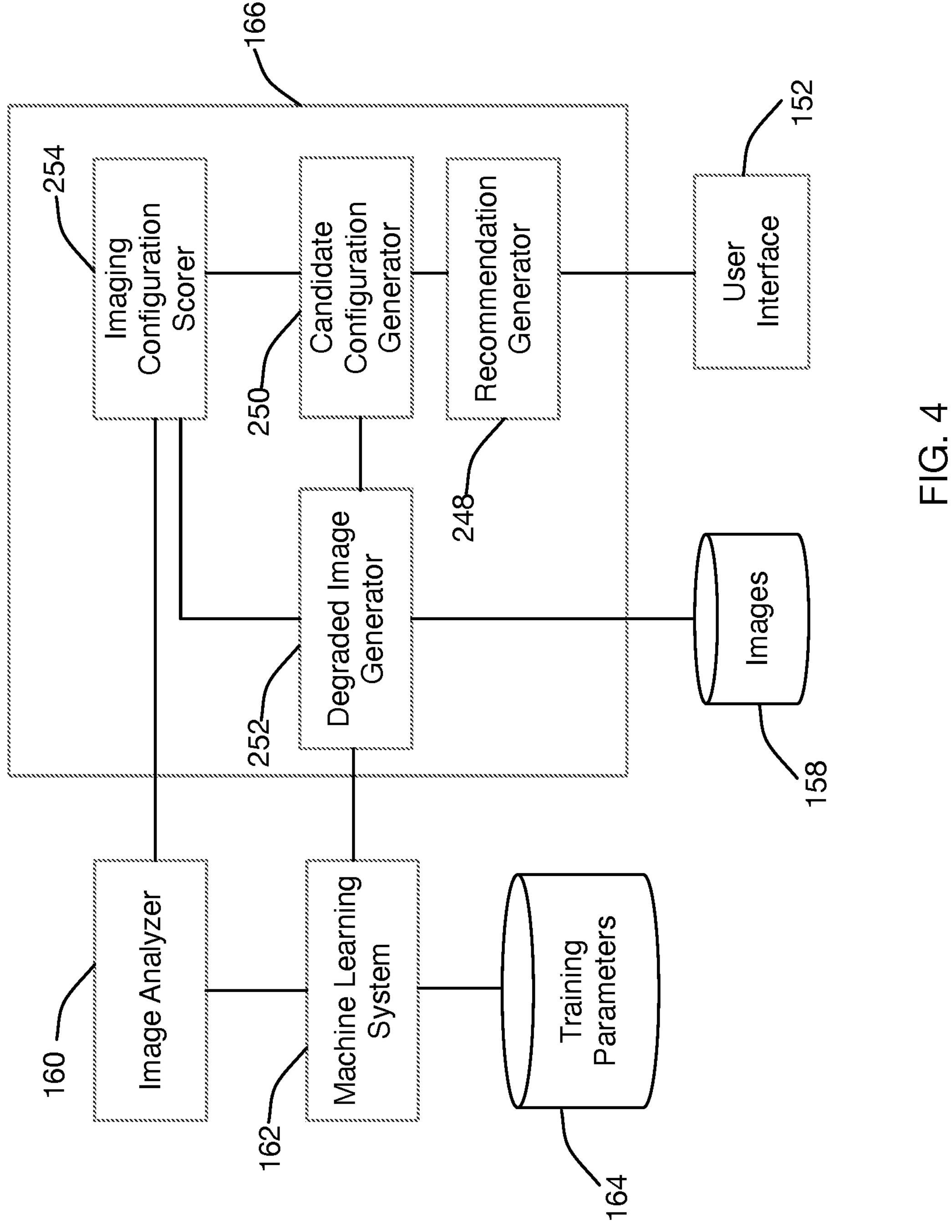
FIG. 4 is a block diagram of an imaging configuration optimizer of the image analysis system of FIG. 2.

Referring to FIG. 4, the imaging configuration optimizer 166 includes a recommendation generator 248 that generates the recommended production imaging configuration, a candidate configuration generator 250 that develops the plurality of candidate production imaging configurations, a degraded image generator 252, and an imaging configuration scorer 254.

FIG. 5 shows a flowchart 300 of the steps undertaken by the imaging configuration optimizer 166 to develop the recommended production imaging configuration. At step 302, the recommendation generator 248 directs the candidate configuration generator 250 to develop the plurality of candidate production imaging configurations from the pilot imaging configuration. In particular, the candidate configuration generator 250 identifies an imaging parameter of the pilot imaging configuration that is associated with a long imaging time (e.g., magnification, exposure time, etc.), use of specialized imaging equipment (e.g., water immersion or other particular optics, specialized filters, particular illumination sources, precise focus, etc.), and/or use of specialized microscopy techniques or sample treatments (e.g., confocal microscopy, fluorescent imaging, sample labeling, etc.), and develops a candidate production imaging configuration in which a value of the imaging parameter is substituted with another imaging parameter value that requires less imaging time, uses conventional imaging equipment and microscopy techniques, and/or does not require specialized sample treatment.

For example, if the pilot imaging configuration specifies using a magnification value of 40×, the candidate configuration generator 250 develops candidate production imaging configurations that specify magnification values of 20×, 10×, and 4×. Similarly, if the pilot imaging configuration specifies using an exposure time of 100 milliseconds, the candidate configuration generator 250 develops candidate production imaging configurations that specify exposure times of 80 milliseconds, 50 milliseconds, 20 milliseconds, and 10 milliseconds.

Other examples of imaging parameter substitutions include, for example, use of an air objective with higher excitation power and exposure time instead of a water immersion objective to avoid longer laser autofocus times and water requirements; use of transmitted light imaging instead of fluorescent imaging; and use of widefield imaging, lower magnification, shorter exposure times, and additional image processing steps instead of confocal imaging with high magnification. It should be apparent to one who has ordinary skill in the art that the candidate configuration generator 250 may be configured to replace particular imaging parameter combinations in the pilot imaging configuration with other parameter combinations to develop the candidate production imaging configuration.

In some embodiments, multiple imaging parameters of the pilot imaging configuration may be substituted to develop one candidate production imaging configuration. For example, the candidate configuration generator 250 may generate a candidate production imaging configuration from the pilot configuration by replacing a high magnification and long exposure time specified in the pilot imaging configuration with a lower magnification and short exposure time. One of ordinary skill in the art would understand that the candidate configuration generator 250 may be configured to substitute particular combinations of imaging parameters specified in the pilot imaging configuration to develop the candidate production imaging configuration.

In some embodiments, the candidate configuration generator 250 may select values of the imaging parameters of the pilot imaging configuration to substitute to develop the candidate production imaging configuration in accordance with a type of cell that comprises the biological sample being analyzed or a size of objects that are detected using the pilot assay protocol. For example, such information may be used to select the objective lens that may be appropriate to substitute. Similarly, intensity values of pixels in the high-quality image associated with identified objects may be used to select exposure time.

Further, the candidate configuration generator 250 may be configured with information regarding the effects of substituting a particular value of an imaging parameter of the pilot imaging configuration on values of other imaging parameters and the candidate production imaging configuration is developed in accordance with such information. For example, changing an objective lens may have known effects on exposure time, focus, Z-step (i.e., focal plan increment) requirements, and acquisition modalities.

After the plurality of candidate production imaging configurations has been developed, at step 304, the candidate configuration generator 250 selects one of the candidate production imaging configurations, and at step 306 directs the degraded image generator 252 to develop from the high-quality image, a degraded image associated with the candidate production imaging configuration at step 304. In particular, the degraded image generator 252 undertakes image processing steps associated with the substitutions made to one or more of imaging parameter of the pilot image configuration to develop the candidate production imaging configuration to generate the degraded image associated with such candidate production imaging configuration. The degraded image predicts an image the microscopy system 100 would produce if operated using the candidate production imaging configuration.

In some embodiments, the image processing steps undertaken by the degraded image generator 252 at step 306 include applying one or more filters to the high-resolution image to generate the degraded image. For example, a degraded image associated with a magnification change between a first objective lens specified by the pilot imaging configuration and a second objective lens specified by the candidate production imaging configuration may be created by scaling the high-quality image in accordance with a ratio of the magnifications associated with the first and second objective lenses. Similarly, a gaussian blur filter may be applied to the high-quality image to develop a degraded image that represents a change in the numerical aperture used to capture the high-quality image and that specified in the candidate production imaging configuration. If multiple imaging parameters are changed between the pilot imaging configuration and the candidate production imaging configuration, image processing functions associated with each of these imaging parameter changes may be applied sequentially to the high-quality image to develop the degraded image.

In other embodiments, the machine learning training parameters data store 164 includes a set of training parameters associated with the substitution of a particular imaging parameter in the pilot imaging configuration to develop the candidate production imaging configuration. In such cases, the degraded image generator 252 selects the set of training parameters associated with such substitution, configures the untrained machine learning system 162 with the selected set of training parameters to develop the trained machine learning system 162, and operates the trained machine learning system 162 with the high-resolution image as an input. In response, the trained machine learning system 162 generates the degraded image associated with the candidate production imaging configuration. For example, the data store 165 may include a set of training parameters to train the machine learning system 162 to develop from the high-quality image a degraded image that represents an image captured by replacing a high-magnification water immersion objective with a lower magnification air objective, replacing fluorescent microcopy with transmitted light microscopy, and the like.

In some embodiments, the degraded image generator 252 stores the degraded image in the images data store 158 as associated with the selected candidate production imaging configuration, also at step 306.

After the degraded image is generated (and stored) at step 306, the imaging configuration scorer 254 analyzes the degraded image to develop the score for the candidate production imaging configuration selected at step 304 that was used to generate the degraded image. In particular, at step 308, the imaging configuration scorer 254 uses the image analyzer 160 to apply the sequence of image processing specified by the pilot assay protocol to the degraded image to identify objects and/or characteristics of objects represented in the degraded image.

Thereafter, at step 310, the imaging configuration scorer 254 compares the objects and/or characteristics of objects identified in the degraded image with those identified in the high-quality image to develop the score. In some embodiments, the imaging configuration scorer 254 calculates a first Z-prime statistic associated with the pilot imaging configuration. As would be understood by one who has ordinary skill in the art, the Z-prime statistic evaluates how well the high-quality image(s) predict(s) differences in cells of the pilot population represented therein. These differences may include, for example, cells of the pilot population to which a treatment has been applied versus a control group of cells that is treated, dead cells that comprise the pilot population versus a control group of live cells, and the like. In addition, the imaging configuration scorer 254, also at step 310, calculates a second Z-prime static associated with the candidate production imaging configuration that indicates how well the degraded image developed in accordance with the candidate production imaging configuration predicts differences in the cells of the pilot population. The imaging configuration scorer 254 develops the score associated with the candidate production imaging configuration in accordance with the first and second Z-prime scores. Such score may be a difference between the two Z-prime scores, a ratio of the two Z-prime scores, and the like.

In other embodiments, the sequence of image processing steps specified by the pilot assay protocol generate an output image. In such embodiments, one of ordinary skill in the art would understand that at step 212 (FIG. 3), the image analyzer generates a first output image by applying the sequence of image processing steps to the high-quality image. Further, a second output image is generated at step 308 when the imaging configuration scorer 254 applies the sequence of image processing steps to the degraded image. In such embodiments, at step 310, the imaging configuration scorer 252 calculates an error (e.g., a root-mean square error or the like) between pixels of the first output image and pixels of the second output images to develop the score.

In some embodiments, the imaging configuration scorer, at step 310, compares first metrics (e.g., area, volume, perimeter, pixel intensity, etc.) of objects identified in the high-quality image versus second metrics of corresponding objects identified in the degraded image associated with the candidate production imaging configuration and develops a score associated with the candidate production imaging configuration in accordance with an error (e.g., root-mean squared error) between the first metrics and the second metrics.

In some cases, at step 212 (FIG. 3), the sequence of image processing steps specified by the pilot assay protocol are applied to one or more high-quality image(s) of wells of a microplate 116 (FIG. 1) disposed in the microscopy system 100 to develop information about each well (e.g., whether the biological sample disposed in the well has been subject to a treatment, ratio of alive cells vs dead cells in each microplate, presence or absence of a particular protein in each well, etc.). In such cases, at step 306, a degraded image is generated that corresponds to each high-quality image of the wells of the microplate 116 (FIG. 1). At step 308, the imaging configuration scorer 254 applies the sequence of the image processing steps to the degraded images corresponding to such high-quality images. Thereafter, at step 310, the imaging configuration scorer 254 develops a score that represents how accurately the results of applying the sequence of image processing steps predicts the information about the biological sample disposed in each well of microplate 116 (FIG. 1).

At step 311, the imaging configuration scorer 254 develop an estimate of how much time will be required to develop one or more image(s) of the biological sample in accordance with the candidate production imaging configuration. The estimate of time may reflect the acquisition time of one or more image(s) of (the well 118, a portion of the well 118, or the entire microplate 116 in which the biological sample is disposed. It should be apparent to one who has ordinary skill in the that the estimate of time may be calculated in accordance with imaging parameters specified by the candidate production imaging configuration including an exposure time of acquiring an image at each focal plane at each site of the biological sample, the number of focal planes at which an image of the site is to be acquired, amount of time needed to focus each focal plane at each site in accordance with the objective lens being used, time to actuate any specialized hardware used to acquire the image, time to move the microplate 116 to have the site in a field of view of the objective lens, a number of sites of the biological sample that are to be imaged, and the like. The estimated time is compared with an amount of time required to acquire the high-quality image(s) in accordance with the pilot imaging configuration and an estimated time savings is calculated for the candidate production imaging configuration.

At step 312, the candidate configuration generator 250 determines if scores have been generated for all of the candidate production imaging configurations developed at step 302. If so, the candidate configuration generator 250 proceeds to step 314, otherwise the candidate configuration generator 250 proceeds to step 304 to select another candidate production imaging configuration.

At step 313, the recommendation generator 248 analyzes the score and the estimated time savings associated with the candidate production imaging configurations developed by the candidate configuration generator 250 and selects one of the candidate production imaging configurations that has the best score and the greatest time saving as a recommended production imaging configuration. In some cases, the recommendation generator 248 selects as the recommended production imaging configuration the candidate production imaging configuration having the greatest time savings from those candidate production imaging configurations having scores that exceed a predetermined amount. In other cases, the recommendation generator 248 selects as the recommended production imaging configuration the candidate production imaging configuration that has the greatest time savings from a predetermined portion of all of the candidate production imaging configurations. The predetermined portion may be a predetermined number (e.g., the three, five, ten, etc.) or percent (five percent, ten percent, etc.) of all of the candidate production imaging configurations having the best scores. It should be apparent to one who has ordinary skill in the art that a criterion the recommendation generator 248 uses to select the best score depends on the metric used to develop scores associated with the candidate production imaging configurations. For example, the best score may be the score having the largest value. Alternately, the best score may be the score having the lowest value, the largest absolute value, the lowest absolute value, a value nearest a predetermined value (e.g., zero or one), and the like.

At step 314, the recommendation generator 248 directs the user interface 152 to instruct the user computer 154 to display the candidate production imaging configurations, the score associated with each candidate production imaging configuration, and optionally an estimate of how much time may be saved using the candidate production imaging configuration instead of the pilot imaging configuration. In some embodiments, the user interface 152 may further instruct the user computer 154 to display for each candidate production imaging configuration, the degraded image associated with the production imaging configuration, the objects identified in the degraded image, and/or the classification of the objects identified in the degraded image, also at step 314.

Also at step 313, the recommendation generator 248 directs the user interface 152 to instruct the user computer 154 to display an indicator that identifies the candidate production imaging configuration selected at step 313 as the recommended production imaging configuration.

Figure 6:
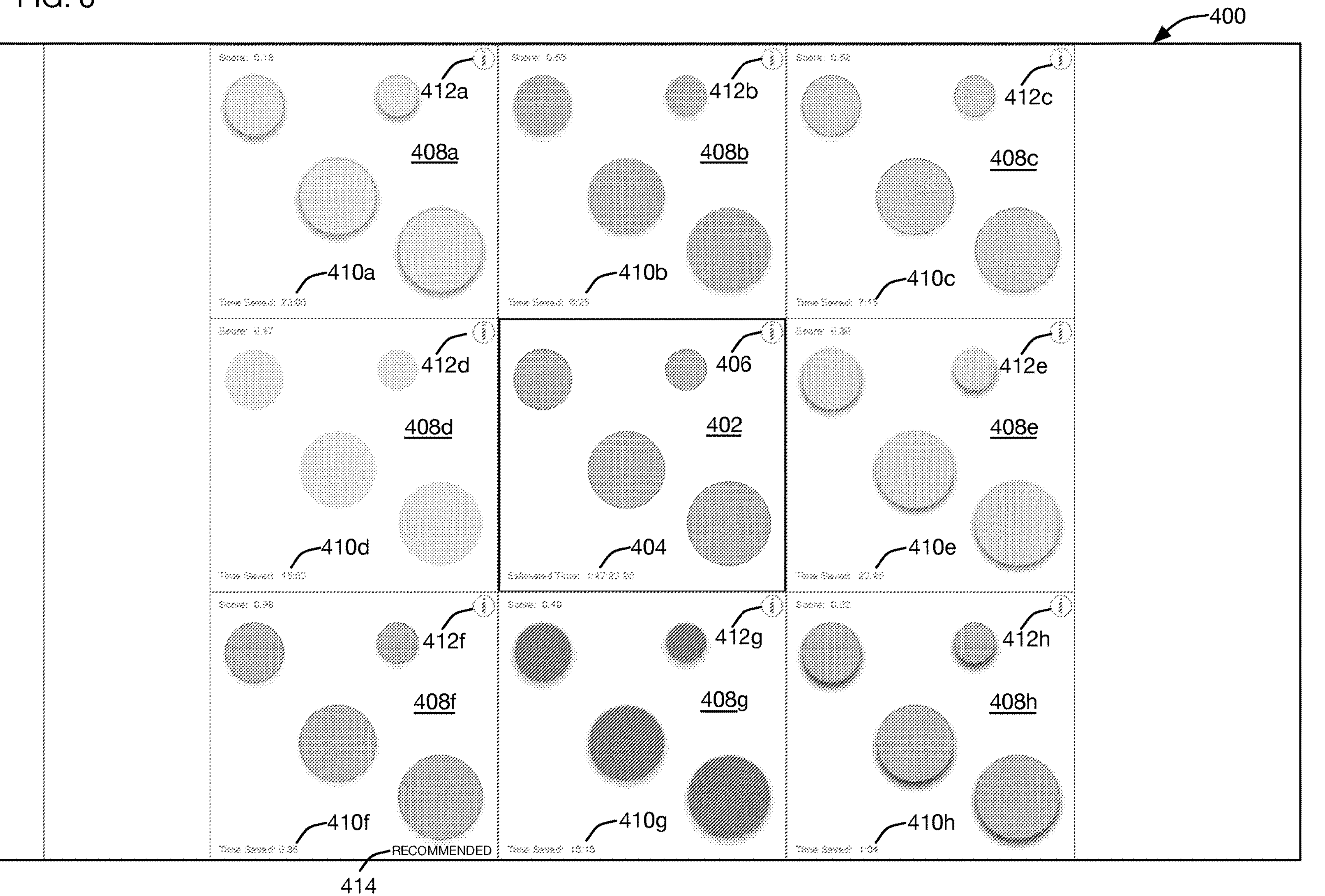
FIG. 6 is a graphical user interface generated by the imaging analysis system of FIG. 2.

Referring to FIG. 6, in one embodiment, the user interface 152 instructs the user computer 154 to generate a GUI 400 in which information regarding the recommended production imaging configuration and other candidate production imaging configurations may be displayed. In particular, the high-quality image is displayed in region 402 of the GUI 400. Overlaid on the high-quality image, in region 404 of the GUI 400, is an estimate of the amount of time required to capture the high-quality image in accordance with the pilot imaging configuration and, in region 406 of the GUI 400, an information icon. If the researcher (or other operator) clicks on (or hovers over) region 406, the user interface 152 instructs the user computer 154 to display the imaging parameters specified by the pilot imaging configuration. These imaging parameters may be displayed, for example, in a pop-up window (not shown), overlaid over region 402 of the GUI, or in another region (not shown) of the GUI 400

In addition, one or more degraded images are displayed in regions **408*a*-408*f* of the GUI 400. Although eight degraded images are shown surrounding the high-quality image in FIG. 6**, it should be apparent to one of ordinary skill in the art that more or fewer degraded images may be shown and in different positions relative to the high-quality image.

For each degraded image displayed in region 408 of the GUI 400, an estimate of the time saved calculated in step 311 (FIG. 3) is displayed in region 410 of the GUI 400 and an information icon is displayed in region 412 of the GUI 400. Selecting or hovering over the information icon displays information regarding imaging parameters of the candidate production imaging configuration associated with the degraded image displayed in region 408. In some embodiments, the differences between the imaging parameters of the candidate production imaging configuration associated with the degraded image and the pilot imaging configuration are displayed when the information icon is selected or hovered over.

An indicator is displayed in region 414 to denote that the recommendation generator 248 selected the candidate production imaging configuration associated with the degraded image displayed in region **408*f*** as the recommended production imaging configuration.

Referring once again to FIGS. 1 and 3, in some embodiments, at step 316, the user interface 152 receives from the user computer 154 a directive, for example, from the researcher (or another operator) to develop a production assay protocol using the recommended production imaging configuration or a selection of another candidate production imaging configurations to use in the production assay protocol. In response, the imaging configuration optimizer 166 at step 318, develops the production assay protocol that comprises the selected candidate production imaging configuration and the sequence of imaging steps from the pilot imaging protocol. Such production assay protocol may then be used by the image analysis system 150 to automatically analyze additional microplates 116 disposed in the microscopy system 100. Further, such production assay protocol may be used with additional image analysis systems 150 in communication with corresponding microcopy systems 100 to automatically analyze microplates 116 disposed in such microscopy systems.

In some cases, the pilot assay protocol developed by undertaking steps 202-216 shown in FIG. 3 may specify acquisition of a plurality of high-quality images of the biological sample using a plurality of corresponding pilot imaging configurations and the sequence of image processing steps may analyze the plurality of high-quality images at 212. It should be apparent to one who has ordinary skill in the art, that the imaging configuration optimizer 166 may create one or more candidate production imaging configuration(s) for each of the plurality of imaging configurations, develop one or more degraded image(s) in accordance with the one or more candidate production imaging configuration (s), and analyze each degraded image to develop a score for the candidate production imaging configuration associated with the degraded image.

One who has ordinary skill in the art would appreciate that the microscopy systems 100 may be remote from the image analysis system 150 and communications between the microscopy systems 100 and the microscopy system interface 156 may be undertaken over a private or public network (e.g., the Internet, a virtual private network, a local area network, a cellular network, and the like). Similarly, the user computer 154 also may be remote from the image analysis system 150 and communications between the user computer 154 and the user interface 152 may be undertaken over a private or public network. Further, components of the imaging analysis system 150 may be operated on one computing device or a plurality of distributed computing devices that communicate with one another over a private or public network. For example, the machine learning system 162 may be provided by cloud service and the accessed by the image analyzer 160 over the Internet. Similarly, the images data store 158 and/or the training parameters data store 164 may be implemented using a cloud-based storage service.

It should be apparent to those who have skill in the art that any combination of hardware and/or software may be used to implement the image analysis system 150 described herein. It will be understood and appreciated that one or more of the processes, sub-processes, and process steps described in connection with FIGS. 1-5 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-5. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the user interface 152, the microscopy system interface 156, the image analyzer 160, the machine learning system 162, and the imaging configuration optimizer 166 of FIG. 2 and the recommendation generator 248, candidate configuration generator 250, the degraded image generator 252, and the imaging configuration scorer 254 of FIG. 4), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units that are collocated or distributed.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

We claim:

1. A method of operating a microscopy system, comprising the steps of:

receiving a first image of a sample acquired using a first imaging configuration;

developing a degraded second image from the first image, wherein the degraded second image simulates an image of the sample that would be acquired if the microscopy system were operated using a second imaging configuration, and wherein the second imaging configuration is a candidate production imaging configuration;

applying a sequence of image processing steps to the first image to develop a first classification of first objects represented in the first image;

applying the sequence of image processing steps to the second degraded image to develop a second classification of second objects represented in the second degraded image;

developing a score associated with the second imaging configuration that represents a difference between the first classification and the second classification; and wherein the image acquisition time or component requirements of operating the microscopy system is less when operated using the second imaging configuration than when operated using the first imaging configuration.

2. The method of claim 1, wherein the first classification of the first objects is associated with identification of one or more objects represented in the first image, identification of one or more objects having a particular characteristic, or metrics associated with one or more objects represented in the first image.

3. The method of claim 1, wherein the score comprises a first score and further including the steps of:

developing a third image from the first image, wherein the third image is associated with a third imaging configuration;

applying the sequence of image processing steps to the third image to develop a third classification;

developing a second score that represents a difference between the first classification and the third classification; and automatically selecting a recommended production imaging configuration, wherein the recommended production imaging configuration is the second imaging configuration if the first score is better than the second score and the recommended production imaging configuration is the third imaging configuration if the second score is better than the first score.

4. The method of claim 1, including the further steps of:

selecting a set of training parameters in accordance with an image processing step of the sequence of image processing steps;

configuring an untrained machine learning system with the selected set of training parameters to develop a trained machine learning system; and operating the trained machine learning system to develop the first classification.

5. The method of claim 1, including the further step of developing the second imaging configuration from the first imaging configuration.

6. The method of claim 5, wherein the first imaging configuration specifies a first value associated with an imaging parameter and the second imaging configuration specifies a second value associated with the imaging parameter, and the first and second values are different and further including the steps of:

selecting training parameters of an untrained machine learning system in accordance with the difference between the first imaging configuration and the second imaging configuration;

training the untrained machine learning system with the selected training parameters to develop a trained machine learning system; and operating the trained machine learning system with the first image as an input to generate the second degraded image.

7. The method of claim 1, wherein the step of receiving the first image comprises the step of acquiring the first image using a first microscopy system, including the further step of acquiring a third image using a second microcopy system in accordance with the second imaging configuration.

8. The method of claim 1, wherein the second degraded image simulates an image of the sample that would be acquired if the microscopy system were operated with the second imaging configuration.

9. The method of claim 1, wherein the second imaging configuration is one of a plurality of candidate production imaging configurations, wherein a score is developed for each of the plurality of candidate production imaging configurations, further including the step of selecting a recommended production imaging configuration from those candidate production imaging configurations having scores that exceed a predetermined amount.

10. The method of claim 1, wherein the second imaging configuration is one of a plurality of candidate production imaging configurations and a classification and a score are developed for each of the plurality of candidate production imaging configurations, further including the steps of:

selecting a recommended production imaging configuration from the plurality of candidate production imaging configurations;

instructing a computer to display information regarding each candidate production imaging configuration of the plurality of candidate production imaging configurations and an indicator identifying the candidate production imaging configuration selected as the recommended production imaging configuration; and receiving from the computer a selection of one of the candidate production imaging configurations with which to configure the imaging system;

wherein the information displayed for each candidate production imaging configuration includes one or more of the score, an estimate of a time savings, an image, and the classification of objects associated with the candidate production imaging configuration.

11. A system for operating a microscopy system, comprising:

an imaging configuration optimizer operating on one or more processors that receives a first image of a sample acquired using a first imaging configuration;

a degraded image generator operating on the one of more processors that develops a degraded second image from the first image, wherein the degraded second image simulates an image of the sample that would be acquired if the microscopy system were operated using a second imaging configuration, and wherein the second imaging configuration is a candidate production imaging configuration;

an image analyzer operating on the one or more processors that applies a sequence of image processing steps to the first image and the second degraded image to develop a first classification, wherein the first classification is associated with first objects represented in the first image; and an imaging configuration scorer operating on the one or more processors that applies the sequence of image processing steps to the second degraded image to develop a second classification that is associated with second objects represented in the second degraded image, and develops a score associated with the second imaging configuration that represents a difference between the first classification and the second classification;

wherein the image acquisition time or component requirements of operating the microscopy system is less when operated using the second imaging configuration than when operated using the first imaging configuration.

12. The system of claim 11, wherein the first classification of the first objects is associated with identification of one or more objects represented in the first image, identification of a characteristic of one or more objects, or metrics associated with one or more objects represented in the first image.

13. The system of claim 11, wherein the score comprises a first score and the degraded image generator develops a third image from the first image, wherein the third image is associated with a third imaging configuration and the imaging configuration scorer applies the sequence of image processing steps to the third image to develop a third classification and develops a second score that represents a difference between the first classification and the third classification, and further comprising a recommendation generator operating on the one or more processors that automatically selects a recommended production imaging configuration, wherein the recommended production imaging configuration is the second imaging configuration if the first score is better than the second score and the recommended production imaging configuration is the third imaging configuration if the second score is better than the first score.

14. The system of claim 11, further including an untrained machine learning system, wherein the image analyzer selects training parameters associated with a step of the sequence of image processing steps, configures the untrained machine learning system using the training parameters to develop a trained machine learning system, and operates the trained machine learning system to develop the first classification.

15. The system of claim 11, further including a candidate configuration generator operating on the one or more processors that automatically develops the second imaging configuration based on the first imaging configuration.

16. The system of claim 15, wherein the first imaging configuration specifies a first value associated with an imaging parameter and the second imaging configuration developed by the candidate configuration generator automatically specifies a second value associated with the imaging parameter, wherein the first and second values are different, and further including an untrained machine learning system, wherein the degraded image generator selects a set of training parameters in accordance with a difference between the first imaging configuration and the second imaging configuration, trains the untrained machine learning system with the selected training parameters to develop a trained machine learning system, and operates the trained machine learning system with the first image as an input to generate the second degraded image.

17. The system of claim 11, wherein the microscopy system comprises a first microscopy system, wherein the first microscopy system is operated in accordance with the first imaging configuration to acquire the first image and a second microscopy system is operated in accordance with the second imaging configuration to acquire a third image.

18. The system of claim 11, wherein the second degraded image simulates an image of the sample that would be acquired if the microscopy system were operated with the second imaging configuration.

19. The system of claim 11, wherein the second imaging configuration is one of a plurality of candidate production imaging configurations, further including a candidate configuration generator and a recommendation generator, wherein the candidate configuration generator develops the plurality of candidate imaging configurations, the imaging configuration scorer develops a score for each of the candidate production imaging configurations, and a recommendation generator selects as a recommended production imaging configuration from those candidate production imaging configurations having scores that exceed a predetermined amount.

20. The system of claim 11, wherein the second imaging configuration is one of a plurality of candidate production imaging configurations and a classification and a score are developed for each of the plurality of candidate production imaging configurations, further including:

a recommendation generator that selects a recommended production imaging configuration from the plurality of candidate production imaging configurations; and a user interface generator that instructs a computer to display information regarding each candidate production imaging configuration of the plurality of candidate production imaging configurations and an indicator identifying the candidate production imaging configuration selected as the recommended production imaging configuration and receives from the computer a selection of one of the candidate production imaging configurations with which to configure the imaging system;

wherein the information displayed for each candidate production imaging configuration includes one or more of the score, an estimate of a time savings, an image, and the classification of objects associated with the candidate production imaging configuration.

* * * * *